United States Patent
Midwinter

[11] 3,944,811
[45] Mar. 16, 1976

[54] DIELECTRIC WAVEGUIDES

[75] Inventor: John Edwin Midwinter, Woodbridge, England

[73] Assignee: The Post Office, London, England

[22] Filed: June 27, 1974

[21] Appl. No.: 483,832

Related U.S. Application Data

[63] Continuation-in-part of Ser. No. 363,527, May 24, 1973, Pat. No. 3,841,731.

[30] Foreign Application Priority Data

June 14, 1972 United Kingdom............... 27854/72

[52] U.S. Cl. ............................ 250/199; 350/96 WG
[51] Int. Cl.² ............................................ H04B 9/00
[58] Field of Search ....... 325/45, 47, 125, 126, 129, 325/130, 145, 344, 427; 178/DIG. 19; 250/199; 329/DIG. 1; 179/15 BP; 333/83 R, 83 A, 83 T; 350/96 WG

[56] References Cited
UNITED STATES PATENTS
3,841,731   10/1974   Midwinter.................... 350/96 WG

*Primary Examiner*—Benedict V. Safourek
*Assistant Examiner*—Jin F. Ng
*Attorney, Agent, or Firm*—Kemon, Palmer & Estabrook

[57] ABSTRACT

The number of modes propagating as guided modes along a dielectric optical waveguide depends on the refractive index difference between core and cladding materials. By altering this difference the number of modes which are permitted to propagate may be controlled. The effective bandwidth of a dielectric optical waveguide depends on the number of modes transmitted because of group delay dispersion and hence this bandwidth may be controlled by controlling the number of propagating modes. In the case of a liquid cored dielectric optical waveguide, the difference between core and cladding refractive indices and hence the bandwidth may be controlled by controlling the temperature of the dielectric optical waveguide.

7 Claims, 8 Drawing Figures

DIELECTRIC WAVEGUIDES

This application is a continuation-in-part of application Ser. No. 363,527, filed May 24, 1973, now U.S. Pat. No. 3,841,731.

The invention relates to a method of, and apparatus for, controlling the bandwidth of dielectric optical waveguides, by limiting the number of modes of propagation.

In the following disclosure the term "optical waveguide" is to be understood as including dielectric waveguides propagating electromagnetic energy in the ultraviolet, visible, and infra-red regions of the spectrum.

In general the use of multi-mode guides for communications suffers from one obvious limitation, namely that imposed by the differential delay dispersion between modes. It is known to impose an upper limit on the number of modes propagating in a dielectric optical waveguide and achieved by a suitable choice of material and dimensions. This may be used to provide a fixed mode filter by which the effect of mode dispersion may be reduced. The present invention seeks to describe a method by which the effect of differential delay dispersion may be both controlled and varied, and apparatus for realising the method.

The number of modes propagating in a dielectric optical waveguide is related to the difference between the squares of the refractive index of the cladding and core materials. Further the refractive indices are functions of temperature. Thus if the temperature coefficients for the refractive indices of the core and sheath materials differ substantially, the number of modes of propagation can be controlled by controlling the temperature of the optical waveguide.

It is an object of the present invention to provide a method of and apparatus for limiting the number of modes propagating in a length of multi-mode dielectric optical waveguide.

Another object of the present invention is to provide a method of and apparatus for controlling the increase of pulsewidth induced in radiation propagating in a dielectric optical waveguide by mode dispersion.

According to a first aspect of the present invention there is provided a mode limiter for use in an optical communications system in which signals are modulated on to a light beam transmitted over a multi-mode dielectric optical waveguide, including mode eliminator means through which said light beam can propagate in only a limited number of modes, to a detector, said signals having a bandwidth after detection determined by said number of modes, said mode limiter comprising:

a. said mode eliminator means,
b. control means for varying said number of modes propagating through said mode eliminator means in response to an error signal,
c. an optical detector for extracting said signals from said light beam after said light beam has propagated through said mode eliminator means,
d. bandwidth measuring means connected to said optical detector for producing an output representative of said bandwidth, and
e. comparator means connected to said bandwidth measuring means for producing said error signal when said bandwidth deviates from a predetermined bandwidth.

An embodiment of the invention will now be described with reference to the accompanying diagrammatic drawings in which.

The number of modes propagating in a multi-mode guide is given approximately by $V^2/2$ where V is the value of the well-known expression $$V = \left[\frac{2\pi a}{\lambda}\right] \cdot (n_1^2 - n_2^2)^{1/2}$$

where $n_1$ is the core refractive index, and $n_2$ is the cladding refractive index and $N \simeq V^2/2$ where N is the number of modes. The radius of the core is $a$. Now since $n_1 \simeq n_2$ and since the core index, $n_1$ is a sensitive function of temperature we can write:

$$n_1 = n_2 + \frac{dn_2}{dT} \cdot (T_0 - T)$$

Where $T_o$ is simply the temperature at which the core index equals that of the cladding (silica).

It now follows directly that the number of propagating modes is a linear function of temperature, since neglecting the products of small terms $$V = \left[\frac{2\pi a}{\lambda}\right] \cdot \left[2n_2 \cdot \frac{dn_2}{dT}(T_0 - T)\right]^{1/2}$$

$$N = \left[\frac{2\pi^2 a^2}{\lambda^2}\right] \cdot \left[2n_2 \cdot \frac{dn_2}{dt}(T_0 - T)\right]$$

At any point in the guide, the number of propagating modes can now be limited to any chosen value simply by heating a short length. For a guide having a total loss of 8 dB/Km, the intermode coupling must be very small over distances of the order of 1 Km, so that a single mode trimmer should effectively set the number of modes carrying the energy for the whole length.

Figure 1:
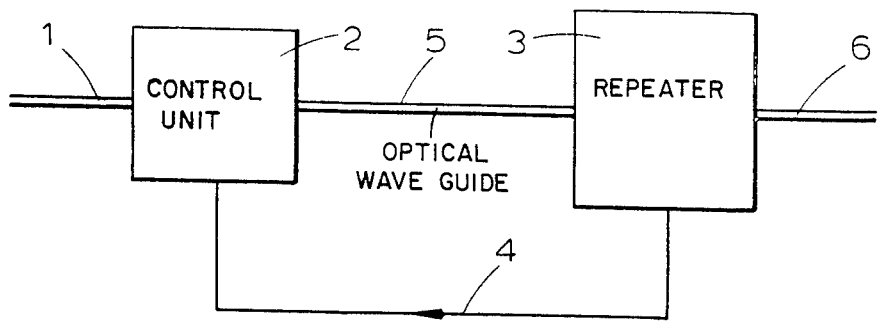
FIG. 1 shows diagrammatically an apparatus for limiting the number of modes propagating in a dielectric optical waveguide system.

Referring now to FIG. 1, which shows a basic system in which the number of modes propagating in an optical waveguide is controlled by heating a section of the optical waveguide; suitable electro-magnetic radiation passes down optical waveguides 1, and through a control section 2, passing down optical waveguide 5, to repeater unit 3, and leaves the system by a third section of optical waveguide 6. The control unit 2 may comprise a portion of optical waveguide which may be the same as or different from the section of optical waveguide 1, 5 and 6. The section of optical waveguide in the dnit 2 is a liquid core waveguide in which the temperature coefficient of the refractive indices of the core and cladding materials is substantially different. This section of optical waveguide may be heated by some means. The electro-magnetic radiation passes from the unit 2, along the optical waveguide 5 to a repeater unit 3. The repeater unit 3 includes a device for measuring the bandwidth of the received signal, and produces an error signal between a desired bandwidth and the measured bandwidth. This error signal is fed along line 4 to the control unit 2, to vary the temperature of the sensitive portion of the optical waveguide.

The control section, or trimmer, 2 allows the repeater to easily control the number of incoming modes to which it is sensitive. This in turn controls the incoming signal bandwidth.

The sensitive section of liquid core waveguide in the trimmer unit 2, consists of a silica tube with a 15 micron diameter bore filled with carbon tetrachloride. It should be understood that other cladding and core materials and dimensions could be equally effectively used in the sensitive section of waveguide. The waveguide may be of other than circular section.

The energy from the trimmed modes is of course lost. The efficiency of the device in a given system will depend upon the efficiency with which low loss modes can be selectively excited in the initial launching process, and also on the gain in total launched energy from a given source as the number of modes is increased.

Figure 3:
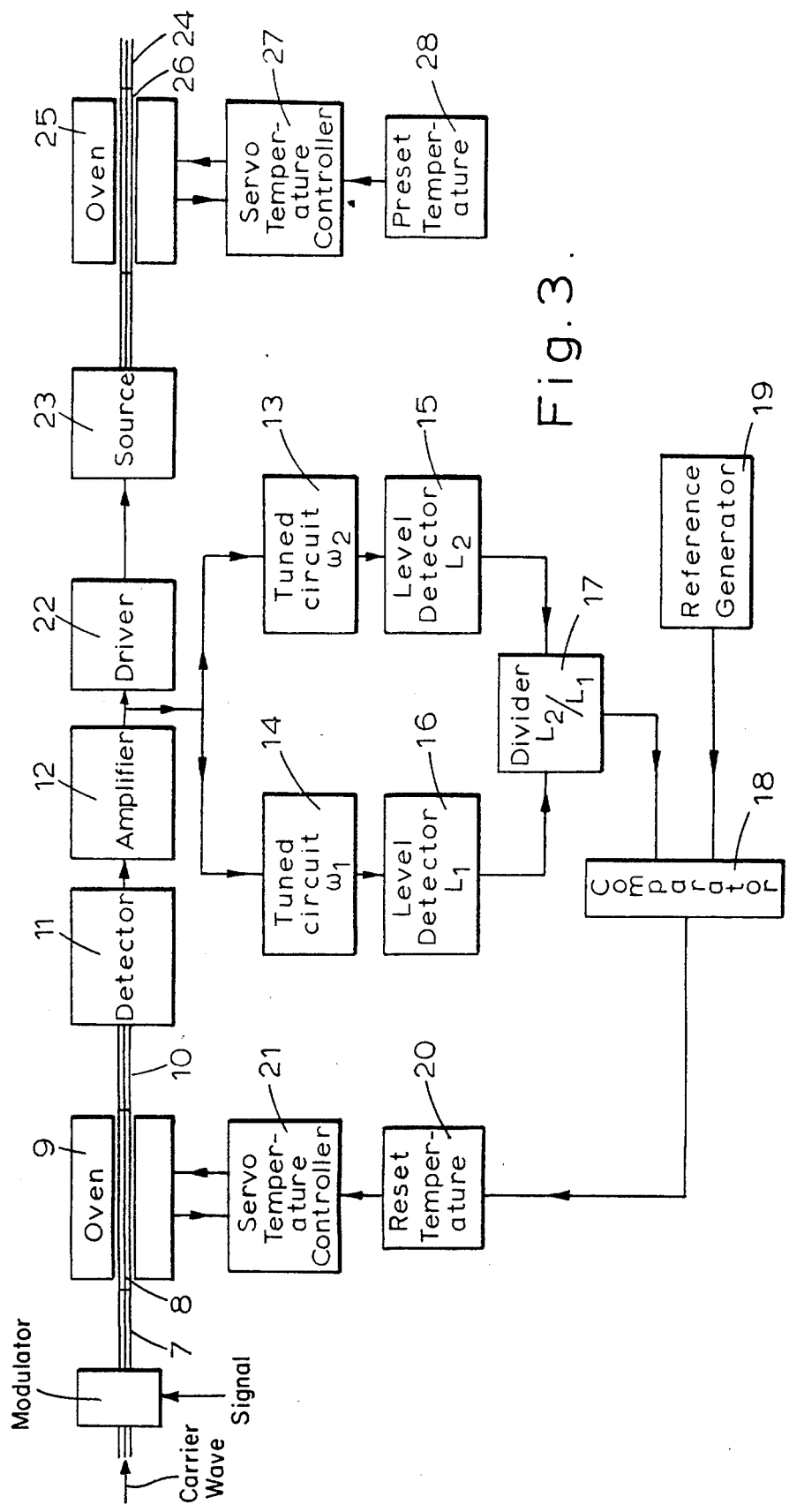
FIG. 3 shows a control circuit for use with an analog modulated optical signal.
Figure 4:
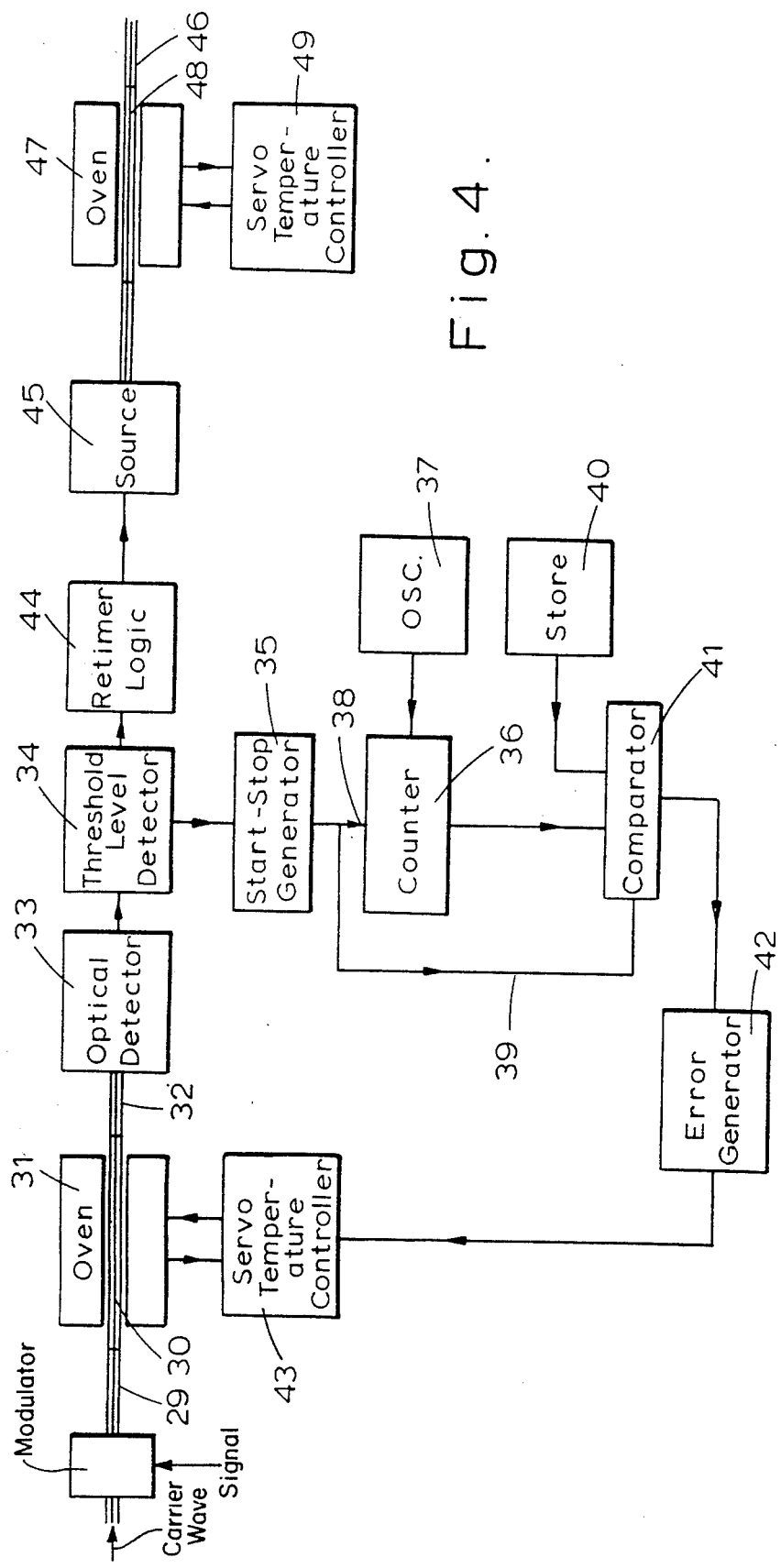
FIG. 4 shows a control circuit for use with a digitally modulated optical signal.

Detailed block schematic drawings of the control systems employed for analog and digital optical signals respectively are shown in FIGS. 3 and 4.

Dealing first with the situation in which the optical signal is amplitude modulated with an analog signal, (this analogue signal may comprise a number of carrier signals which are themselves either amplitude, frequency, or phase modulated), the light signal enters the system via dielectric optical waveguide 7. The light is then coupled into a section, 8, of liquid cored dielectric optical waveguide, enclosed in an oven or heater 9. The output from dielectric optical waveguide 8, passes via a dielectric optical waveguide, (or is coupled directly) to an optical detector 11, which may be a photo-diode of known type. The output of detector 11 is the signal, in electrical form, which is modulated on to the optical signal.

Figure 5:
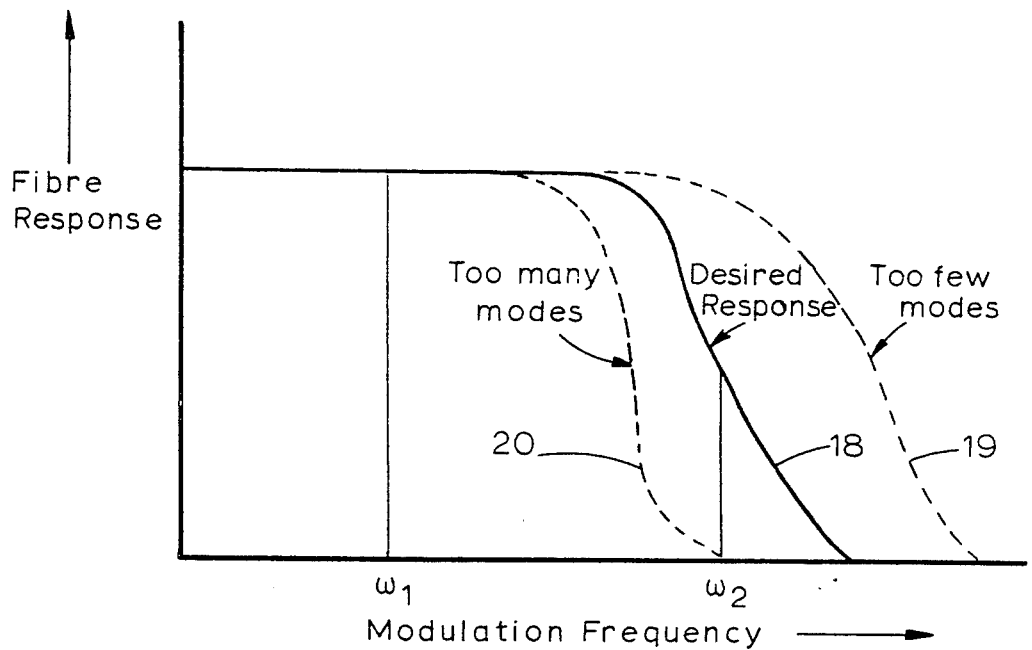
FIG. 5 shows a graph of fibre response against modulation frequency for an analogue modulated optical signal.

The signal modulated on to the optical signal contains a frequency, $\omega_2$ corresponding to the half power point of the cut-off edge of the required bandwidth, and also a frequency $\omega_1$ corresponding to the flat response region of the desired bandwidth, see FIG. 5.

The detected signal is amplified by amplifier 12 and the portion of the amplified signal passed to tuned circuits 13 and 14 which isolate $\omega_2$ and $\omega_1$ respectively. The levels $L_2$ and $L_1$ of frequencies $\omega_2$ and $\omega_1$ are measured by level monitors 15 and 16, and signals representing these levels passed to divider 17, which produces a signal representative of $L_2/L_1$.

If the oven temperature is set to pass too few modes, the received optical signal at detector 11 will be weak and will result in a poor signal to noise ratio in the detector output. However under these conditions the bandwidth of the signal will be greater than optimum bandwidth, curve 18, of FIG. 5, and may typically have the form of curve 19 of FIG. 5. On the other hand if too many modes are passed by the section of dielectric optical waveguide 8, the optical signal strength will be high, but the bandwidth will be less than the optimum value as shown by curve 20, resulting in loss of high frequencies of the modulated signal. (The high frequencies will be "smeared out" because of the different propagation delays of different modes).

Figure 6:
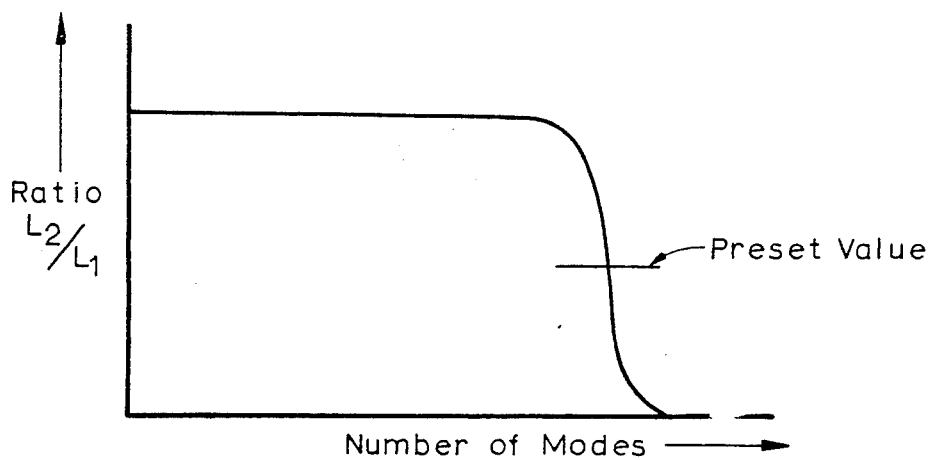
FIG. 6 shows a graph of the ratio of signal level at two frequencies modulated on to the optical signal as a function of the number of modes propagating through the dielectric optical waveguide.

If the number of modes propagating through the system is plotted as a function of $L_2/L_1$ the curve shown in FIG. 6 is obtained. From this it can be seen that $L_2/L_1$ is an extremely sensitive parameter for determining bandwidth. In addition $L_2/L_1$ is independent of line attenuation and depends only on the number of modes propagating.

Referring back to FIG. 3; the output of divider 17 is fed to an analog comparator 18 where it is compared with a signal corresponding to a preset value of ratio $L_2/L_1$, derived from reference generator 19. The output signal from comparator 18 is used to reset the temperature of oven 9. This operation is performed via the temperature reset unit 20 and servo temperature controller 21. The temperature reset unit may for example cause a resistance to change in a bridge circuit of which one arm is a platinum resistance thermometer monitoring the temperature of oven 9, or it may adjust a voltage level used by a potentiometer measuring a thermo couple EMF.

Thus in operation if the effective bandwidth of the optical transmission system deviates from the ideal, curve 18, shown in FIG. 5, the value of $L_2/L_1$ will change, comparator 18 will produce a signal to cause the temperature of oven 9 to be changed in a manner to correct the bandwidth.

Frequencies $\omega_2$ and $\omega_1$ may be pilot frequencies modulated on to the optical carrier.

The remainder of the repeater circuit operates in a conventional manner, the output of amplifier 12 operates a driver circuit 22 which powers and modulates a suitable source 23, e.g. a GaAs laser. The output of source 23 is then fed to output dielectric optical waveguide 24. The number of modes excited in the output dielectric optical waveguide may be controlled by a second oven 25 enclosing a second section of liquid cored dielectric optical waveguide 26. This oven 25 is, however, operated at a preset temperature and is not controlled by a feed back loop of the type used to control oven 9. The oven temperature is simply maintained at a preset level by servo-temperature controller 26 and reference generator 28 (which presets the temperature).

The optical system may be operated with either the oven 9 and its associated control system alone, or with both oven 9 and oven 25.

If the optical system is modulated with a digital signal in the form of a pulse train, then the alternative system shown in FIG. 4 may be used. In this system bandwidth is monitored by measuring the pulse width of incoming optical signals. The pulse width is of course directly related to group delay pulse broadening and hence to the number of modes propagating in the dielectric optical waveguide 29 and the bandwidth. The incoming optical signal in dielectric optical waveguide 29, passes through a section of liquid cored dielectric optical waveguide, 30 whose temperature is controlled by an oven 31. The optical signal is then passed via dielectric optical waveguide 32 to detector 33 (a suitable photo-diode). The output of detector 33 consists of a train of pulses. The pulses are reshaped by threshold detector 34, so that they have fast rise and fall times. The duration of the pulses however is not substantially effected by the threshold detector 34. The leading edge of each pulse produced by the threshold detector 34 actuates start-stop generator 35 to generate a start counting pulse on line 38. This causes counter 36 to start counting clock pulses generated by oscillator 37. The trailing edge of each pulse generated by threshold detector 34 causes start-stop generator 35 to produce a stop counting pulse on line 38 and 39. This causes counter 36 to stop counting and initiates a comparison operation whereby the contents of counter 36 is compared with a preset count held in a store 40, by digital comparator 41. The contents of counter 36 represents the actual pulse width of pulses received over the optical communications system, and the count stored in store 40 represents the pulse width at which the bandwidth has its optimum value.

The contents of counter 36 may be stored for M consecutive pulses and an average value obtained. This average value is then used as the input to comparator 41.

The output of comparator 41 causes an analog signal representative of the difference between the measured pulse width and the desired pulse width, to be generated by error generator 42. This analog error signal is used to actuate servo temperature controller 43 which adjusts the temperature of oven 31 so that the liquid cored dielectric optical waveguide 30 passes the required number of modes.

The remaining portion of the system operates conventionally. The output pulse from threshold level detector 36 are retimed and reshaped by retiming logic. The output of retiming logic 44 is used to drive a light source e.g. a Ga As laser 45 which feeds an optical signal into dielectric optical waveguide 46. The number of modes excited in dielectric optical waveguide 46 can be controlled by an oven 47, a section of liquid cored dielectric optical waveguide 48 and temperature servo controller 49.

Figure 7:
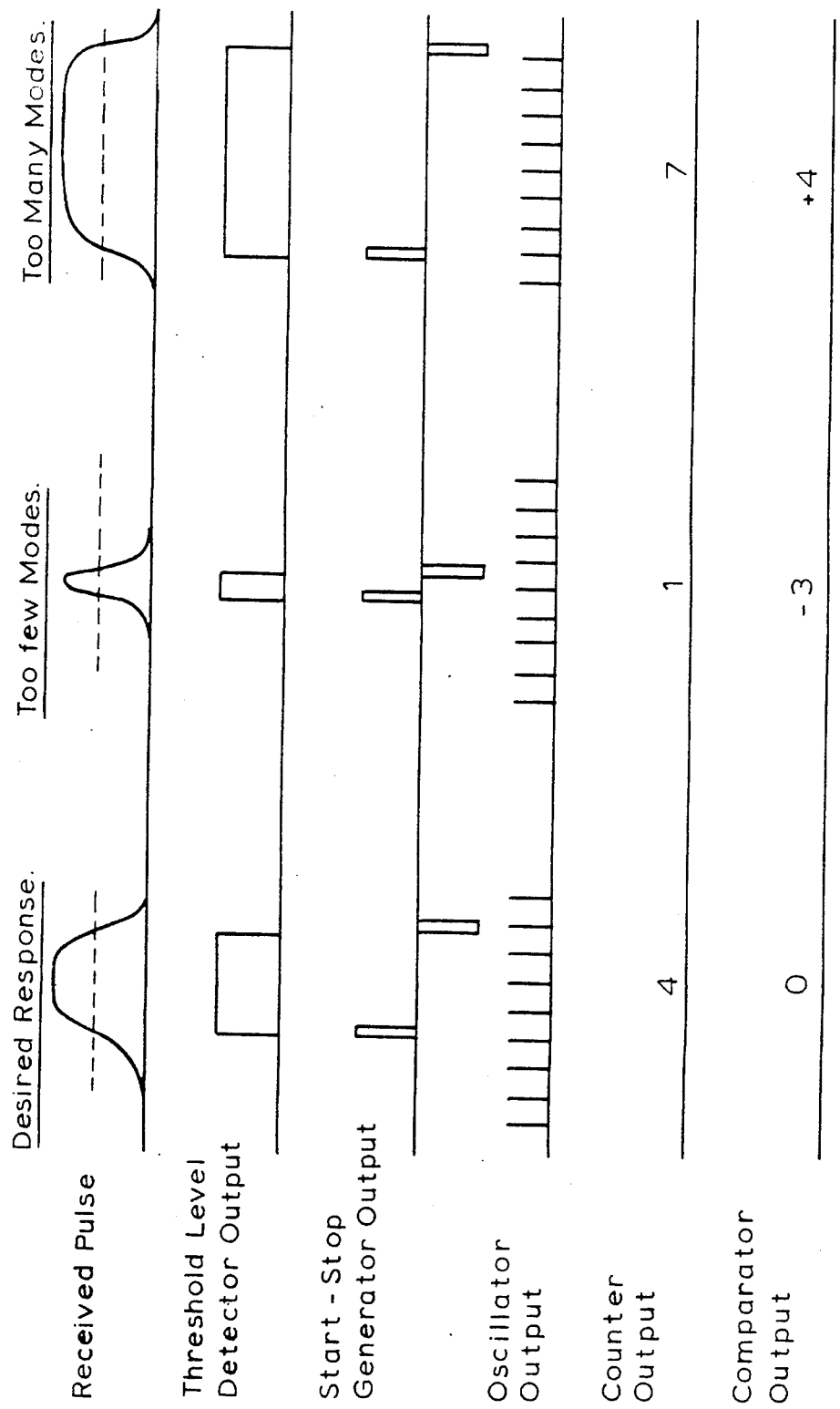
FIG. 7 shows a series of waveforms at different points in the circuit shown in FIG. 4.

The waveforms in different parts of the bandwidth monitor, for the input pulse having the correct width, being too narrow, and being too wide are shown in FIG. 7.

Figure 2:
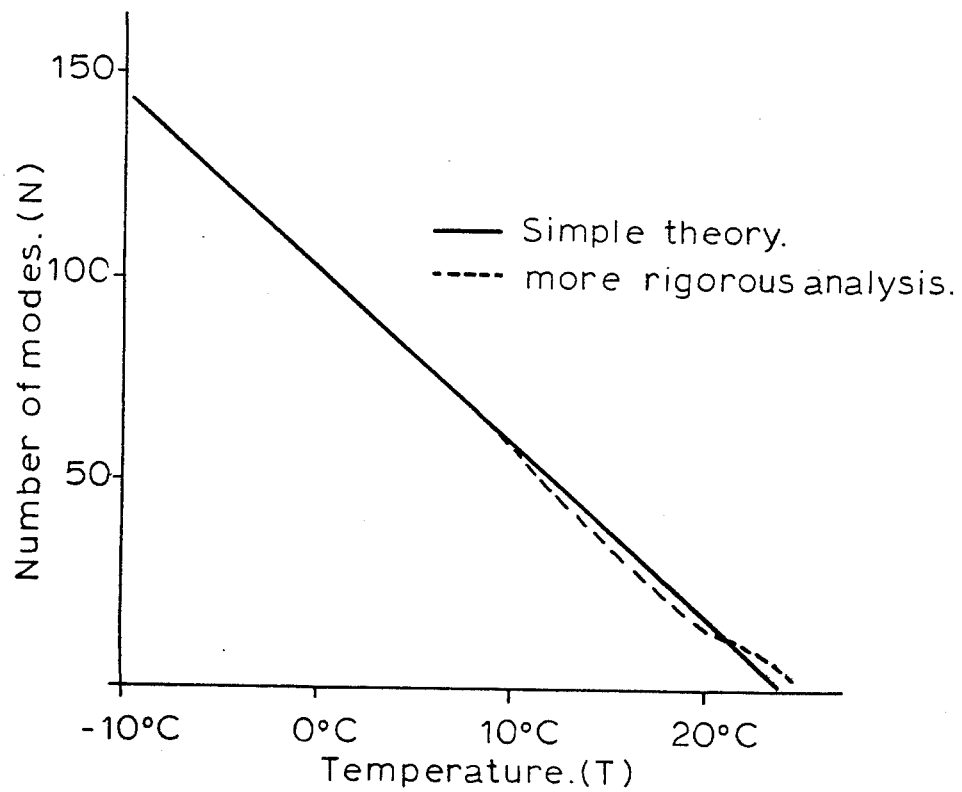
FIG. 2 shows a graph in which the number of modes propagated is plotted against temperature for a liquid cored optical guide having a cladding of silica, and a core of carbon tetrachloride.

FIG. 2 shows the relationship between temperature and the number of modes, N. The straight line gives the relationship derived from the simple theory described above. The curved line is the result of a more rigorous analysis. From the graph it can be seen that there is substantially no difference between the theory quoted in the specification and the more rigorous analysis, except for small values of N.

Figure 8:
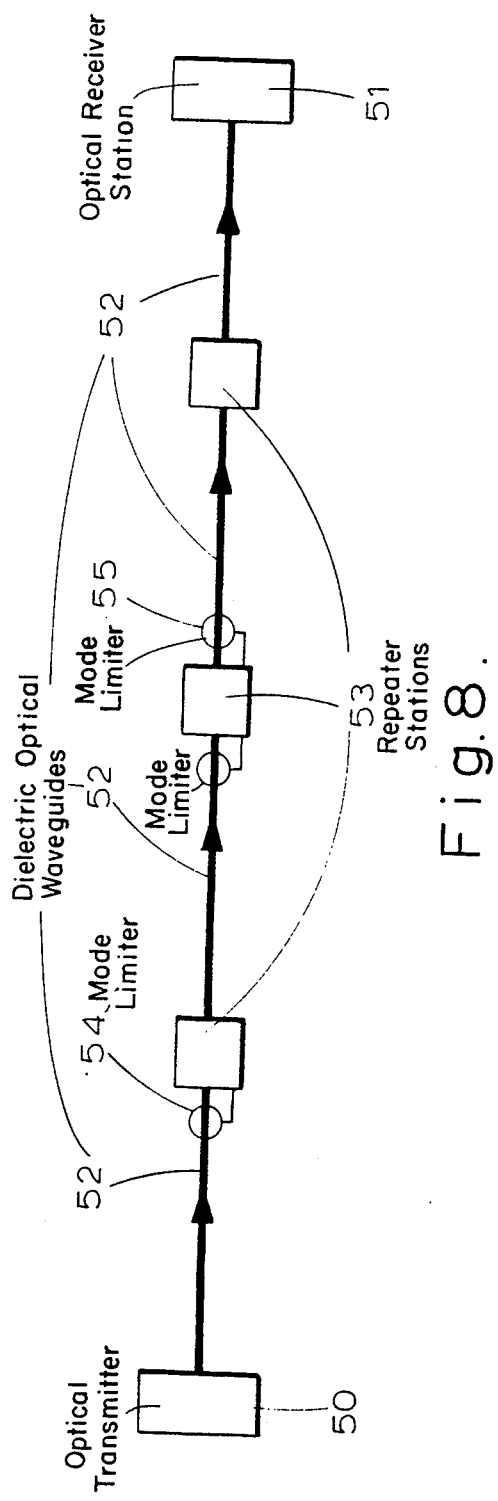
FIG. 8 shows an optical communications system employing mode limiters according to the invention.

The mode limiters herein described may be used in an optical communication system of the type illustrated in FIG. 8. The system consists of an optical transmitter station 50, connected to an optical receiver station 51 via dielectric optical waveguides 52. A plurality of repeater stations 53 are positioned between adjacent sections of dielectric optical waveguide. These serve to make good attenuation in the optical signal and counteract the effects of group delay dispersion. Each repeater may be equipped with a mode limiter 54 as previously described on its input side and/or a mode limiter 55 on its output side.

What is claimed is:

1. A mode limiter for use in an optical communications system in which signals are modulated on to a light beam transmitted over a multi-mode dielectric optical waveguide, including more trimmer means, through which said light beam can propagate in only a limited number of modes, to a detector, said signals' having a bandwidth after detection determined by said number of modes, said mode limiter comprising:

mode trimmer means including a section of liquid cored dielectric optical waveguide whose temperature determines said number of modes;

control means for varying the temperature of said guide to vary the number of modes propagating through said trimmer means in response to an error signal;

an optical detector for extracting said signals from said light beam after said light beam has propagated through said mode eliminator means;

bandwidth measuring means connected to said optical detector for producing an output representative of said bandwidth; and comparator means connected to said bandwidth measuring means for producing said error signal when said bandwidth deviates from a predetermined bandwidth.

2. A mode limiter as claimed in claim 1 wherein said signals includes a first pilot signal and a second pilot signal, and said bandwidth measuring means includes:

a. isolator means for isolating from said signals, said first pilot signal and said second pilot signal, having a first and a second level respectively;

b. level monitoring means connected to said isolator means for measuring said first and second levels; and c. divider means connected to said level monitoring means for producing a ratio signal representative of one of said first and second levels divided by the other level, said divider means having an output connected to a first input of said comparator means.

3. A mode limiter as claimed in claim 2 wherein said comparator means has a second input connected to a reference generator means.

4. A mode limiter as claimed in claim 3 wherein said device for varying the temperature is a heater.

5. A mode limiter as claimed in claim 1 wherein said signals include a train of signal pulses, each signal pulse, after detection, having a duration related to said bandwidth; said comparator means is a digital comparator means; and said bandwidth measuring means comprises:

a. clock pulse generator means for generating clock pulses; and b. counter means for counting said clock pulses for the duration of one signal pulse, said counter means being connected to a first input of said digital comparator means.

6. A mode limiter as claimed in claim 5 wherein said digital comparator means has a second input connected to a store means containing a predetermined count.

7. A mode limiter as claimed in claim 6 wherein the said device for varying the temperature is a heater.

* * * * *